United States Patent [19]

Lentz

[11] 4,210,795

[45] Jul. 1, 1980

[54] SYSTEM AND METHOD FOR REGULATING POWER OUTPUT IN A MICROWAVE OVEN

[75] Inventor: Ronald R. Lentz, Wayzata, Minn.

[73] Assignee: Litton Systems, Inc., Beverly Hills, Calif.

[21] Appl. No.: 964,917

[22] Filed: Nov. 30, 1978

[51] Int. Cl.² .............................................. H05B 9/06
[52] U.S. Cl. ........................... 219/10.55 B; 73/355 R; 219/10.55 R; 324/58 B
[58] Field of Search ................... 219/10.55 B, 10.55 R, 219/10.55 A, 10.55 M, 10.55 C, 10.55 F; 73/355 R, 359 R, 359 A; 324/58 B, 58 C, 58.5 B, 58.5 C

[56] References Cited

U.S. PATENT DOCUMENTS

| | | | |
|---|---|---|---|
| 3,233,172 | 2/1966 | Ludma | 324/58 B |
| 3,541,434 | 11/1970 | Mullen | 324/58 C |
| 3,704,409 | 11/1972 | Oomen | 324/58 B |
| 3,875,361 | 4/1975 | Fukui et al. | 219/10.55 B |
| 3,999,027 | 12/1976 | Moore | 219/10.55 B |
| 4,009,359 | 2/1977 | Tallmadge et al. | 219/10.55 B |
| 4,049,938 | 9/1977 | Ueno | 219/10.55 B |

*Primary Examiner*—Arthur T. Grimley
*Attorney, Agent, or Firm*—Albert L. Underhill; Robert E. Lowe

[57] ABSTRACT

A method and control system for regulating the output power of a magnetron in a microwave oven having a food heating cavity, a magnetron, and a waveguide coupling the magnetron to the heating cavity. The reflection coefficient within the waveguide is measured and a control signal is generated to switch the magnetron between first and second levels of power output when the reflection coefficient reaches a pre-determined value indicating that the food item within the oven has begun to defrost. In the preferred embodiment, the present invention incorporates digital signal processing utilizing a microprocessor to calculate the reflection coefficient and generate the control signal based upon digital signal inputs that are a function of the detected microwave energy within the waveguide.

19 Claims, 6 Drawing Figures

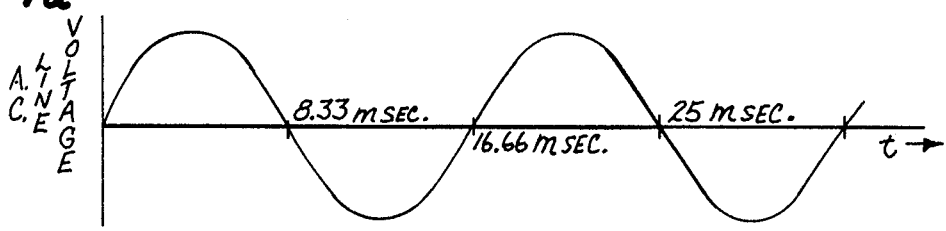
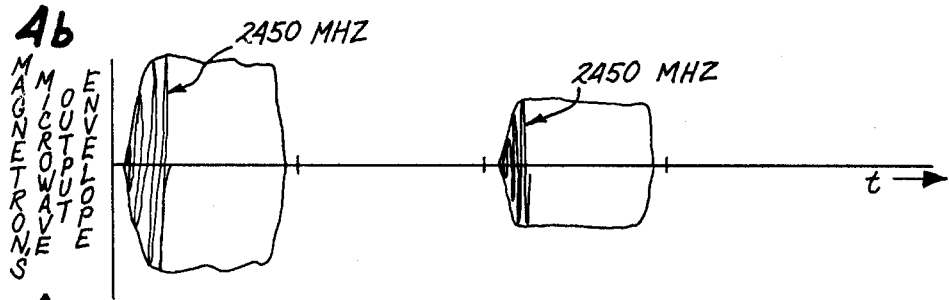
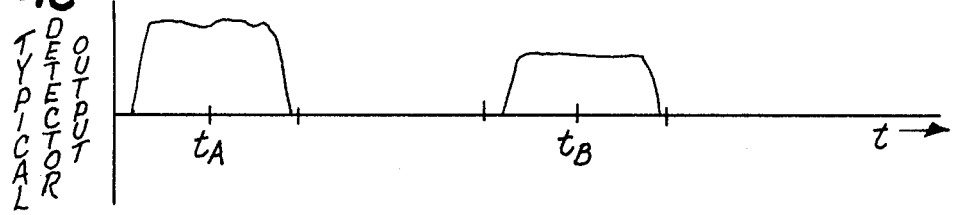
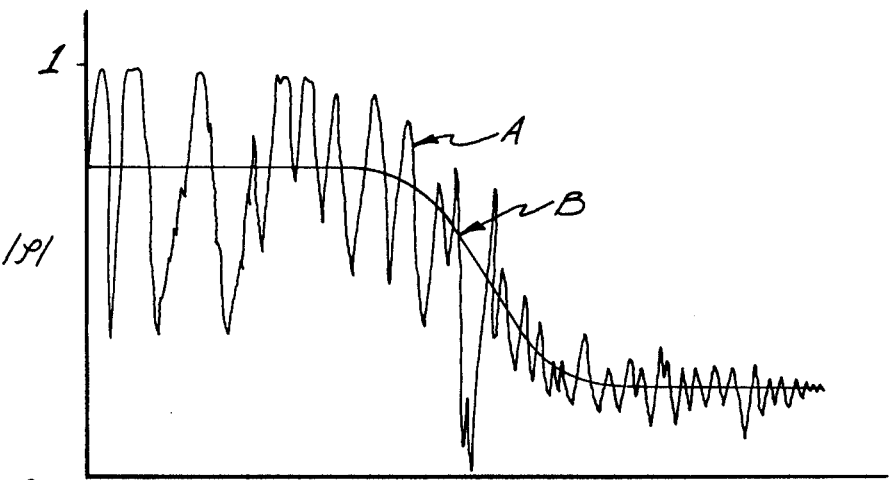

SYSTEM AND METHOD FOR REGULATING POWER OUTPUT IN A MICROWAVE OVEN

BACKGROUND OF THE INVENTION

The present invention relates broadly to a control system and method for regulating the power output of the magnetron of a microwave oven in response to the state of the food item within the oven. More specifically, the present invention relates to a control system and method for regulating the defrost mode of the microwave oven wherein the microwave oven is first energized in a highpower defrost mode and then switched to a low-power defrost mode as the food item within the oven begins to thaw.

As is well known, a food item that is defrosting will have some portions that will tend to thaw and warm up more quickly than others. Under continuous application of high-power in a thaw or defrost mode these portions of the food item will thaw and become lossy causing them to absorb more microwave power and become still warmer while other portions of the food item remain in a frozen state. This phenomena may lead to a runaway condition where a portion of the food item has thawed and is cooking while other portions are still frozen and absorbing little microwave energy. The food item may become overcooked in some portions and eventually remain undercooked in other portions thereof. Such circumstances are unacceptable in today's microwave oven industry.

This problem has been dealt with in the prior art by providing for a timed defrost mode where the magnetron of the microwave oven is operated under very low average power to permit thermal diffusion to correct for spatially uneven microwave heating within the food item. Although this prior art method deals with the problems of potential runaway, as previously described, it results in extended defrost modes of operation. It is desirable, however, to minimize the defrost time.

It is also known that the reflection, or conversely the absorption, characteristics of a food item undergoes significant change as the food item passes from the frozen to the thawed state. It is also known that this characteristic of the defrosting or thawing food item can be monitored by detection of the microwave input reflection coefficient within the microwave oven. In accordance with the present invention, therefore, the microwave oven is initially operated in a high-power defrost mode. The reflection coefficient within the microwave oven is continuously monitored and compared to a value of reflection coefficient that indicates beginning of thaw or defrost in the food item. The control system of the present invention then switches the magnetron to a low-power operation to complete the thawing operation. The present invention thereby senses that part of the food item that has thawed and terminates the high-power defrost mode. The overall effect of the control system and method of the present invention is to shorten the required defrost time particularly with larger food items. Other characteristics of microwave oven operation can be determined utilizing the control system of the present invention, for example, determination of stoppage of the microwave energy mode stirrer and the values of the forward and reflected power within the microwave oven's microwave feed system.

SUMMARY OF THE INVENTION

The present invention is a means for controlling the microwave oven heating cycle in a microwave oven having a food heating cavity, a magnetron, and waveguide means for coupling the heating cavity to the magnetron. The controlling means includes detector means coupled to the microwave oven for measurement of the microwave reflection coefficient within the oven and means connected to the detector means and to the magnetron for regulating the power output of the magnetron in response to the measured input reflection coefficient.

In the preferred embodiment, the present invention incorporates digital signal processing. In an alternative embodiment, analog signal processing is contemplated. In either embodiment, the present invention incorporates as a detector means a plurality of square law detectors coupled to the microwave oven and having inputs disposed within the oven for excitation by the microwave energy therein and having outputs on which output signals are generated proportional to the power input to the detectors. Means are connected to the square law detectors for generating a control signal representative of the reflection coefficient in response to the output signals of the square law detectors. The regulating means comprises a means responsive to the control signal for switching the magnitrons between first and second power output levels.

In the digital signal control system of the present invention a microprocessor is utilized having circuit means for calculating the reflection coefficient in response to the output signals from the square law detector and circuit means for comparing the calculated reflection coefficient with a pre-determined value indicative of the state of the food item within the cavity and generating the control signal. In one embodiment of the digital control system a directional coupler is coupled to the waveguide means and first and second square law detectors are disposed at opposite ends of the directional coupler to generate first and second output signals proportional to the forward and reflected microwave power within the waveguide. In another embodiment of the digital control network three square law detectors are mounted with input probes disposed linearly within the waveguide means and spaced apart by $\lambda/8$ where $\lambda$ is the wavelength of the microwave in the waveguide at the operating frequency of the oven.

The analog embodiment of the present invention includes integrator circuit means for averaging the outputs of the square law detector over a pre-determined time interval. A divider circuit means is provided for generating an output signal proportional to the ratio of averaged outputs from the integrator circuit means. A comparator is provided to compare the output signal from the divider circuit to a pre-determined value. The output of the comparator circuit is connected to a relay which controls the switching of the magnetron from first and second power input levels.

The method of controlling the heating process within the microwave oven in the present invention comprises the steps of detecting the microwave reflection coefficient, generating a control signal representative of the detected reflection coefficient, and regulating the power output of the magnetron of the microwave oven in response to the control signal generated. The step of detecting the reflection coefficient further comprises the step of detecting microwave energy within the waveguide means and generating at least two signals each proportional to the microwave power detected. The reflection coefficient is then calculated based upon the generated signals proportional to the microwave power. In the preferred embodiment, the output signals proportional to the microwave power are sampled over a pre-determined time interval and the average value of the reflection coefficient is calculated over the pre-determined time interval. Finally, the average value of the reflection coefficient is compared to a pre-determined value and the magnetron is switched from initial high-power output to a low-power output when the average value has a pre-determined relationship to said pre-determined value.

The present invention, therefore, is a method and control system for regulating the power output of the magnetron of a microwave oven and, in particular, is a control system and method for switching the power output of the magnetron of the oven from initial high-power defrost mode to a low-power defrost mode by monitoring the state of the food item within the cavity. The state of the food item within the cavity is monitored by measurement of the reflection coefficient within the waveguide means of the microwave oven. Both digital control systems incorporating a microprocessor and an analog control network is disclosed, and in each system a control signal is generated to regulate the power output of the magnetron when the reflection coefficient reaches a pre-determined value indicating the beginning of defrost in the food item. The method and control systems of the present invention provide a means for decreasing the time for defrost in the microwave oven while at the same time eliminating the prior art problems of runaway resulting when specific portions of the food item thaw before other portions of the food item. These and other advantages of the present invention will become apparent with reference to the accompanying drawings, detailed description of the preferred embodiment and claims.

BRIEF DESCRIPTION OF THE DRAWINGS

FIG. 4 is a graph of waveforms illustrating the operation of the control network of the present invention;

FIG. 6 is a graph illustrating the values of the input reflection coefficient within the microwave oven as a function of time.

DETAILED DESCRIPTION OF THE PREFERRED EMBODIMENT

Figure 1:
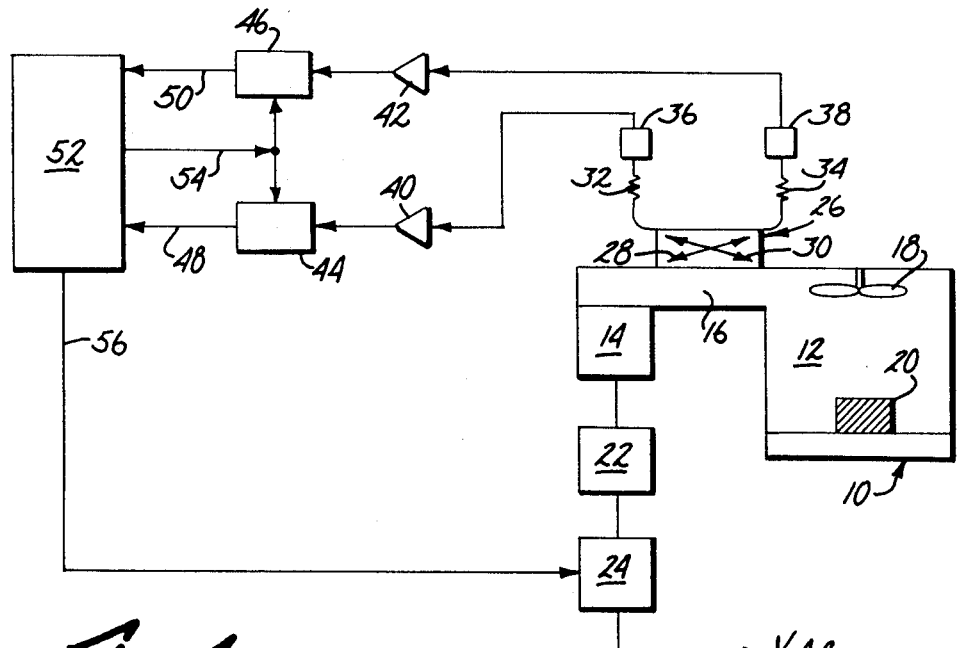
FIG. 1 is a schematic representing one embodiment of the present invention incorporating digital processing.
Figure 2:
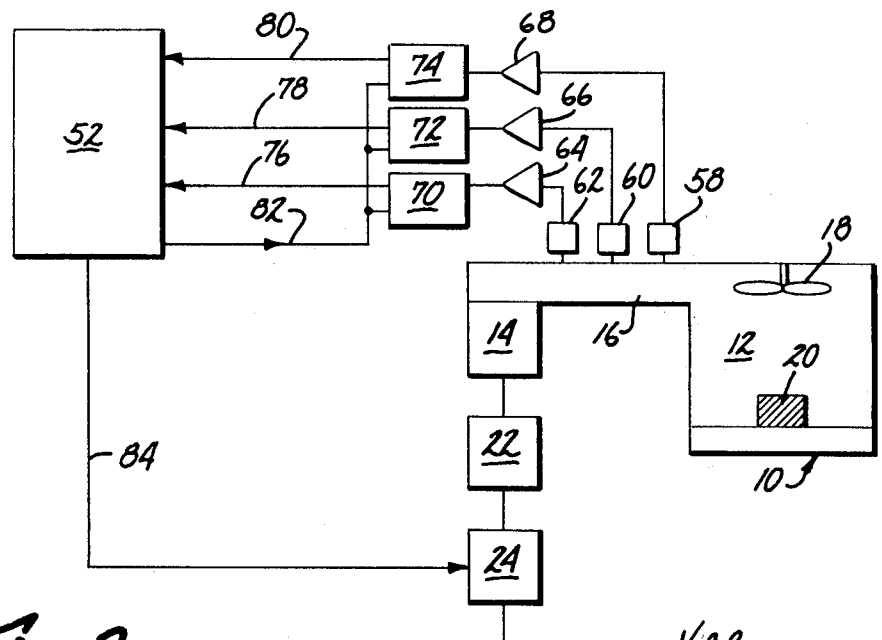
FIG. 2 is an alternative embodiment of the control network of the present invention incorporating digital processing.
Figure 3:
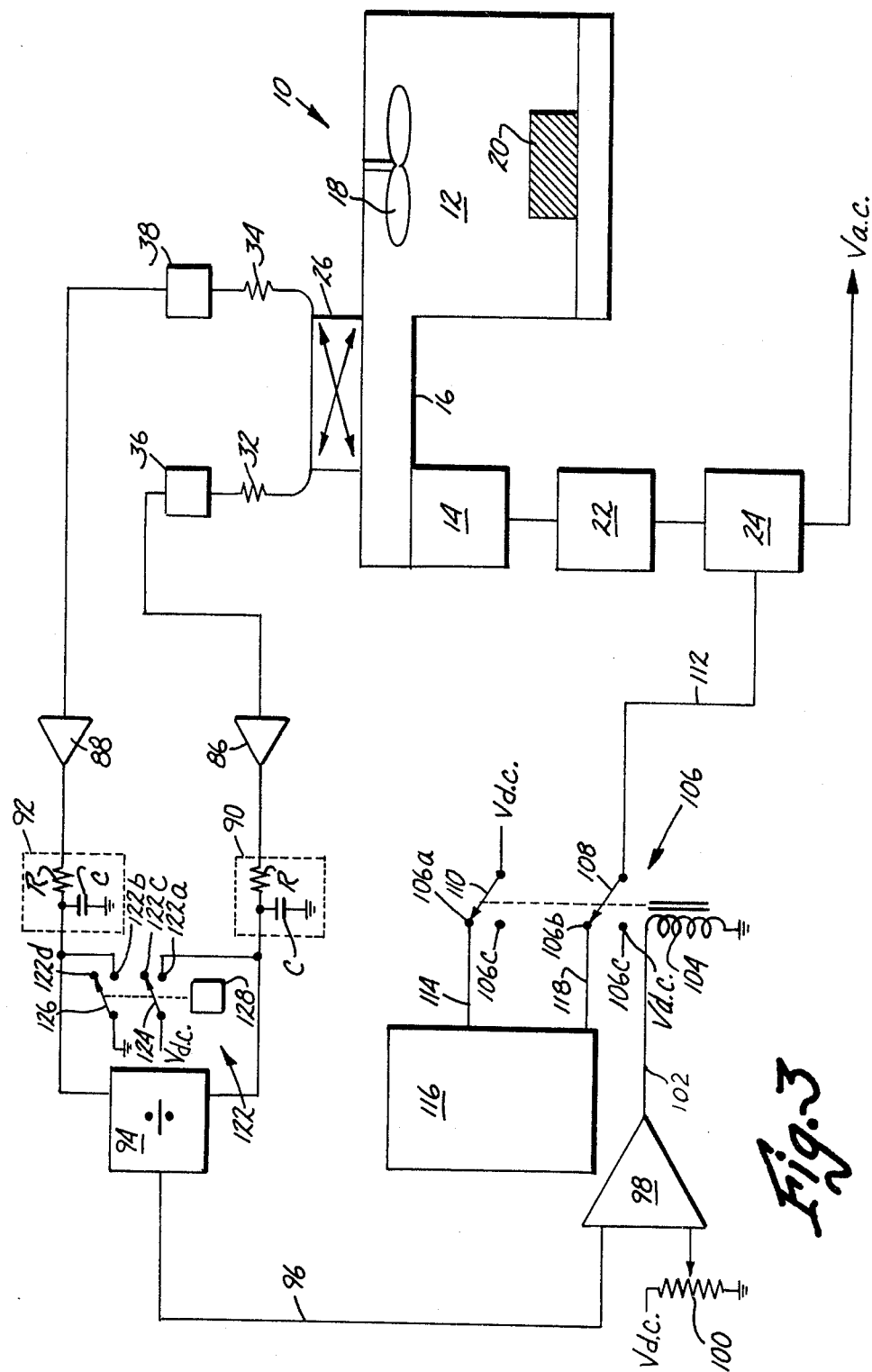
FIG. 3 is an alternative embodiment of the present invention utilizing analog signal processing.

Referring to the drawings, wherein like numerals represent like parts throughout the several views, FIGS. 1 and 2 illustrate digital control systems for regulating the defrost mode of a microwave oven while FIG. 3 illustrates a defrost control system incorporating an analog system processing. In each embodiment, a microwave oven is shown schematically at 10. Oven 10 includes a cooking cavity 12, a magnetron 14, and a waveguide 16 coupling the magnetron to cavity 12. Typically, a mode stirrer 18 may be provided proximate the opening of wave guide 16 into cavity 12. Mode stirrer 18 may be, for example, a fan-like blade member which is mechanically rotatable. As is well-known in the art, the function of mode stirrer 10 is to deflect and evenly distribute the microwaves throughout cavity 12 to ensure even cooking of a food item 20. Magnitron 14 is energized by a power supply 22 regulated by a power control circuit 24 that is connected to a source of AC power, $V_{AC}$. The elements described thus far are of conventional microwave oven design and are well-known in the art. For example, wave guide 16 is typically a rectangular guide having an enclosed end at magnetron 14 with an opposite end opening into cavity 12. Power supply 22 typically comprises a half-wave doubler circuit with a current regulating transformer to energize magnetron 14. Control circuit 24 may be a conventional switching circuit to turn power supply 22 on and off.

FIG. 1 illustrates the control system of the present invention incorporating a directional coupler, designated generally at 26, to detect microwave energy within waveguide 16. Directional couplers are also well-known in the prior art and typically include a wave guide member coupled to waveguide 16 by means of apertures. Directional coupler 26 is coupled to waveguide 16, by means of particular spacing of apertures, etc., such that microwaves in the forward traveling direction from magnitron 14 to cavity 12 travel in the forward direction as indicated by the arrows 28 in coupler 26 while microwaves reflected from cavity 12 toward magnetron 14 travel in the reverse direction shown generally by the arrows 30 in coupler 26. It should be understood that this principle and method of separating forward and reflected microwave energy through coupler 26 is well-known in the prior art. Disposed at opposite ends of coupler 26 are attenuators 32 and 34 connected to square law detectors 36 and 38, respectively. Attenuators 32 and 34 are arranged to have low "reflection" when viewed from the directional coupler effectively preventing interference between the forward and reverse sampled signals. In the embodiment disclosed in FIG. 1, attenuators 32 and 34 are shown simply as resistors. Detectors 36 and 38, as previously indicated, are conventional square law devices wherein the output voltages thereof are proportional to the input power, i.e. $V_0 = kP_{in}$, where $P_{in}$ is the input power to the detector and k is a constant determined by the directional coupler, the attenuator and the specific square law detector utilized.

The outputs of detectors 36 and 38 are connected to amplifiers 40 and 42, respectively. The outputs of amplifiers 40, 42 are connected in turn to analog-to-digital converters 44 and 46, respectively. The analog input signals to converters 44 and 46 appear as digital input signals on lines 48 and 50 to a conventional microprocessor 52. Microprocessor 52 has an output at 54 which is connected to analog-to-digital converters 44 and 46. Microprocessor 52 generates a signal applied on output 54 to initiate the analog-to-digital conversion. As will be described in more detail hereafter, the conversion command may be provided at specific pre-determined intervals to sample the outputs of detectors 36 and 38. Microprocessor 52 also has an output at 56 which is connected to power control circuit 24. Microprocessor 52, as previously discussed, is of conventional design having a memory, processing circuits, and input and output circuits. A suitable clock signal is provided to regulate the operation of microprocessor 52 and may be, for example, a signal from the AC power line.

FIG. 2 illustrates an alternative embodiment of the control system of the present invention incorporating digital signal processing. Specifically, a plurality of square law detectors 58, 60, and 62 are coupled directly to wave guide 16 and have probes disposed therein. Detectors 58–62 may be, for example, diode detectors. Similarly, detectors 36 and 38, as shown in FIG. 1, may also be diode detectors. Even though three detectors are shown, it is understood that any number of such detectors may be utilized, but that three detectors spaced apart at λ/8 intervals, where λ is the wave length of the microwaves at the fundamental frequency of the magnetron 14 has been found to be particularly applicable. Each detector 58–62 may be connected to a probe disposed within the wave guide 16 such that each probe is excited by the microwave field within the wave guide. The output of each detector 58–62, which is again proportional to the power input to the detector, is connected to the input of amplifiers 64, 66 and 68, respectively. Amplifiers 64–68 have gains which boost the input signals and have outputs connected to analog-to-digital converters 70, 72, and 74, respectively. Converters 70–74 convert the input analog signals to digital signals which are fed on lines 76, 78, and 80 to digital inputs of microprocessor 52. Microprocessor 52 is provided with a digital output lines at 82 which is connected to analog to digital converters 70, 72 and 74. The output signal on line 82 initiates the analog to digital conversion at pre-selected time intervals to thereby sample the output of detectors 58–62. As previously discussed with the embodiment disclosed in FIG. 1, microprocessor 52 is conventional and includes a memory, processing circuits, and digital output and input circuits. Microprocessor 52 has a control signal output at 84 which is connected to power control circuit 24.

FIG. 3 represents an embodiment of the control system of the present invention incorporating analog signal processing. The analog system, in the preferred embodiment utilizes a directional coupler 26 identical in nature and function to the directional coupler described with reference to FIG. 1. As in FIG. 1 and the embodiment disclosed therein, directional coupler 26 has an associated pair of attenuators 32 and 34 connected to square law detectors 36 and 38. The outputs of detectors 36 and 38 are applied to the inputs of amplifiers 86 and 88, respectively. The outputs of amplifiers 86, 88 are connected to first and second integrator circuits shown in dashed lines at 90 and 92. Each integrator circuit 90 and 92 comprises a resistor R and a capacitor C. The outputs of integrator circuit 90 and 92 are applied as inputs to a divider circuit 94. The output of divider circuit 94 is a signal representative of the ratio of the input signals from circuits 90 and 92. The output signal of divider 94 appears on line 96 as one input to a comparator 98. The other input of comparator 98 has a pre-selected input signal applied thereto through a variable resistor voltage divider 100 and a source of DC potential, $V_{dc}$. The output of comparator 98 is connected by line 102 through the energization coil 104 of a relay 106. Relay 106 includes a pair of movable contact arms 108 and 110. Arm 110 is connected to a source of DC potential, $V_{dc}$ while contact arm 108 is connected by line 112 to power control circuit 24. Contact arms 108 and 110 are normally in a closed position and connected to contacts 106a and 106b. Contact 106a is connected by line 114 to provide input power to a low-power timed defrost controller 116. Contact 106b is connected to an output line 118 of controller 116. Relay 106 also includes a contact 106c which is connected to the source of DC potential, $V_{dc}$. A relay 122 is also provided for start-up of the control system. Relay 122 has a switch arm 124 which is connected to a source of DC potential, $V_{dc}$. Relay 122 has a switch arm 126 which is normally connected to ground. Relay 122 has a pair of normally open contacts 122a and 122b and a pair of normally closed contacts 122c and 122d. Switch arms 124 and 126 are normally connected to closed contacts 122c and 122d. Contact 122a is connected to the output of integrator circuit 90 while contact 122b is connected at the output of integrator circuit 92. Relay 122 is adapted to be manually energized by the depression of a time-delay push button 128. The function and purpose of relay 122 will be described in more detail hereafter.

The present invention will now be described first with reference to the digital processing control systems disclosed in FIGS. 1 and 2 and then with reference to the analog control system of FIG. 3. For the purpose of discussion, particularly the description of the digital control systems, reference will be made to FIGS. 4 and 5. FIG. 4a illustrates the waveform of the AC voltage typically having a frequency of 60 Hz. FIG. 4b is a typical wave form of the output of the magnetron utilizing the conventional halfwave doubler circuit previously described. For the sake of discussion herein, it is understood that the fundamental frequency of the magnetron is 2450 MHz, which is typical for commercially available models. A typical output of the square law detectors is shown at FIG. 4c. With reference to FIG. 1, with a frozen food item 20 within cavity 12 the microwave oven is energized and the initial high-power defrost is initiated. Detectors 36 and 38 generate voltage signals proportional to the forward and reflected power within wave guide 16. The reflected power is, of course, a function of the reflection coefficient of food item 20. The outputs of detectors 36 and 38 may be only a few millivolts. Therefore these outputs are increased by amplifiers 40 and 42 and fed to analog digital converters 44 and 46. At appropriate sampling intervals, to be described in more detail hereafter, anaglog to digital conversion is initiated through a start conversion signal on line 54 and digital inputs provided on lines 48 and 50 to microprocessor 52. The start conversion command on line 54 is typically given near the peak of the line voltage during the halfwave the magnetron is energized. Microprocessor 52 is programmed to calculate the reflection coefficient ρ based upon the signals input at 48 and 50. In the calculation the following mathematical equations are applicable.

$$P_f = \frac{V_f}{k_f}$$
$$P_r = \frac{V_r}{k_r}$$

where: $P_f$ is the forward power
$P_r$ is the reflected power
$K_f$ and $k_r$ are proportionality constants determined by the directional coupler, the attenuators and the detector used.

Additional mathematical equations are:

$$V_f = \frac{V_f}{A_f}$$

$$V_r = \frac{V_{rd}}{A_d}$$

where: $V_f$ is the voltage output of the forward detector
$V_r$ is the voltage output of the reflection detector
$A_f$ and $A_d$ are the gains of corresponding amplifiers
$Y_{fd}$ and $V_{rd}$ are the digital signals applied to microprocessor 52

The reflection coefficient is therefore calculated as follows:

$$\rho = \sqrt{\frac{P_r}{P_f}} = \sqrt{\frac{V_r}{k_r} \cdot \frac{k_f}{V_f}} = \sqrt{\frac{V_{rd}}{k_r A_d} \cdot \frac{k_f A_f}{V_{fd}}}$$

$$\rho = \sqrt{\frac{V_{rd}}{V_{fd}} \cdot \frac{k_f}{k_r} \cdot \frac{A_f}{A_r}}$$

If the detectors, amplifiers and attenuators are identical pairs of devices with the same characteristics, then to simplify the mathematics the calculation reduces to:

$$\rho = \sqrt{\frac{V_{rd}}{V_{fd}}}$$

Utilizing the multiprobe technique shown in FIG. 2, three detectors are here utilized to measure the reflection coefficient. The voltage output of the three detectors 58–62 are amplified and fed to analog-to-digital converters 70–74. Analog to digital conversion is initiated by signal on line 82 which provides digital signals $V_1$, $V_2$ and $V_3$ on lines 80, 78 and 76, respectively. Microprocessor 52 computes the value of the reflection coefficient $\rho$ from the following formula in which it is presumed that the detectors, coupling probes and amplifiers have been adjusted so that a non-reflecting load placed at the end of the waveguide produces an identical digital voltage signal at the three input ports of the microprocessor.

$$\rho = \frac{\sqrt{2} \sqrt{(V_1 - V_2)^2 + (V_2 - V_3)^2}}{(V_1 + V_3) + \sqrt{4V_2(V_1 + V_3 - V_2) - (V_1 - V_3)^2}}$$

In the above discussion of the three probe technique it is also assumed that the probes are spaced one eighth of the wavelength apart at the operating frequency of the microwave oven.

Thus far with respect to FIGS. 1 and 2 a description has been provided of the calculation of the value of the reflection coefficient at an instantaneous time. FIG. 6 is a graph of the reflection coefficient as a function of time in the defrost process. The instantaneous value of the reflection coefficient varies dramatically as shown at A. The variance is due primarily to the rotating stirrer 18 which obviously alters the transmission and reflection characteristics as seen in waveguide 16. The detector outputs are therefore sampled a number of times during a period of the mode stirrer rotation to then calculate an average value of the reflection coefficient.

The average value as a function of time is illustrated in FIG. 6 at B. In the preferred embodiment the number of samples used to compute the average value of reflection coefficient $\rho$ is expected to be greater than 10 but less than 100. In the following discussion $\Delta T$ is the time between the samples and the period of the mode stirrer is approximately equal to $N \times \Delta T$.

Figure 5:
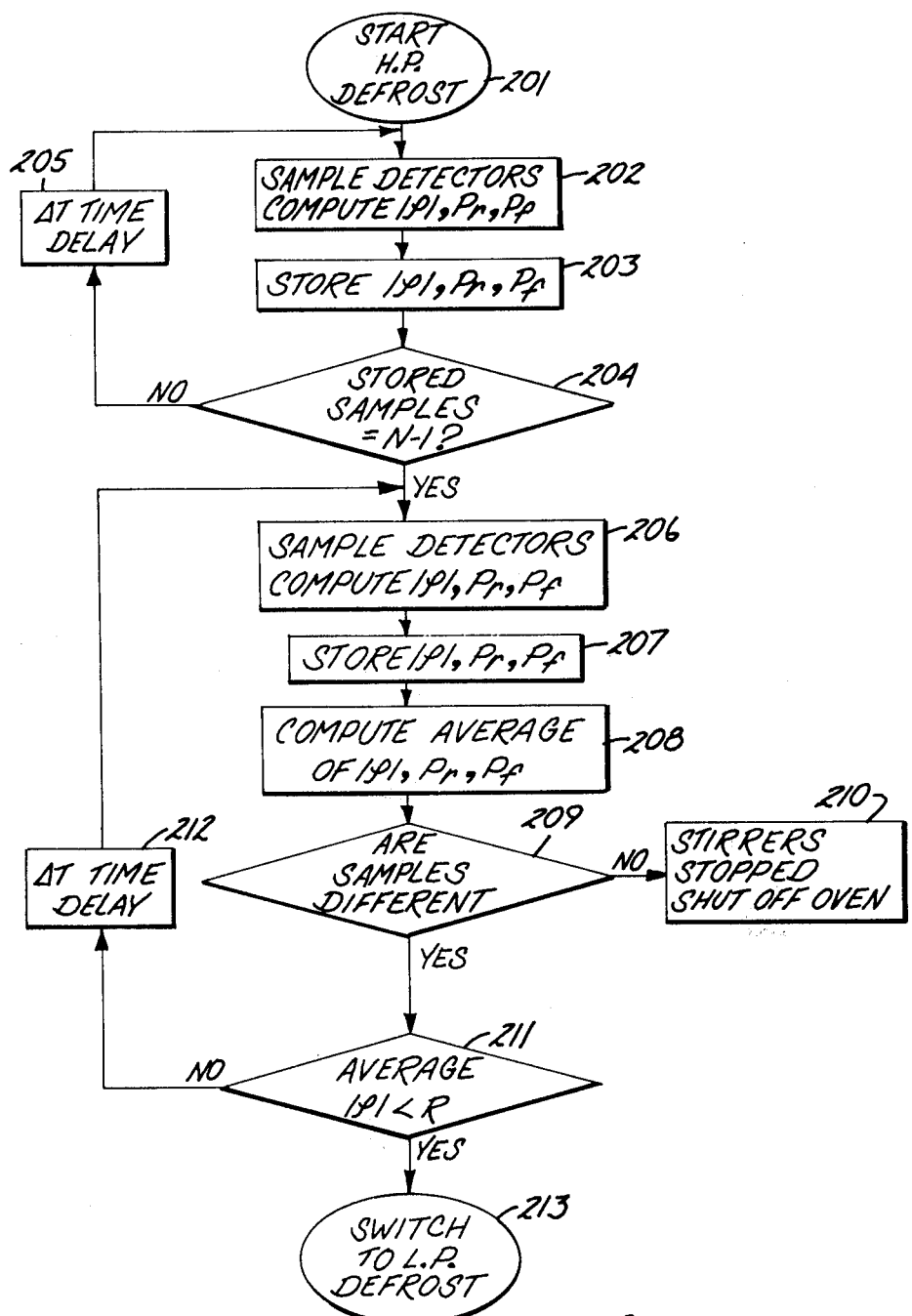
FIG. 5 is a flow chart illustrating the method of regulating the output power of the magnetron in accordance with the present invention.

The signal processing within microprocessor 52 to calculate the average value of the reflection coefficient $\rho$ and generate control signals in response thereto is illustrated in the flow chart of FIG. 5.

High-power defrost is initiated at 201. The magnetron 14 is thereby energized to its highest available power output. At step 202 the square law detectors are sampled and the microprocessor computes the values of the reflection coefficient $\rho$, the forward power $P_f$, and the reflected power $P_r$. For the purpose of the present invention, it may be only necessary to compute the reflection coefficient $\rho$. For other functions of the microwave oven, the values of the forward and reflective power at a given time may be utilized and are therefore stored for further computation or control of microwave oven functions. As previously indicated, sampling of the detectors occurs during the halfwave of the AC line voltage that the magnitron is generating. N sampling are utilized to compute the reflection coefficient and forward and reverse power. It is contemplated that N will be an integer greater than 10 but less than 100. The samples are taken at time intervals $\Delta T$ where $N \times \Delta T$ is approximately equal to the period of the mode stirrer 18. The process proceeds to step 203 where the computed values of the reflection coefficient, and forward and reverse power, are stored within the microprocessor memory. Step 204 is encountered where it is determined whether or not a number of stored samples is equal to N minus 1. If the answer at 204 is negative, the program returns to step 202 after a time interval $\Delta T$ indicated at step 205. If the response at 204 is positive then step 206 is entered whereby the detectors are again sampled and the values of the reflection coefficient, forward power, and reflected power are computed. At step 207 the values computed at step 206 are stored. At step 208 the average values of the reflection coefficient $\rho$, the forward power, and reflected power are computed. The average value of the reflection coefficient as a reflection of time is shown as the plot B on FIG. 6.

At step 209 inquiry is made as to whether or not the samples taken differ from previous samples. If the answer at 209 is negative indicating that mode stirrer 18 has ceased its periodic rotation, step 210 is entered whereby power to the microwave oven is terminated. If the answer at 209 is positive, step 211 is encountered where the average value of the reflection coefficient is compared to a pre-determined value R. In the preferred embodiment when the average value of $\rho$ is less than R, block 213 is entered whereby a control signal is generated to switch the oven to low power defrost mode. R is preferably selected to indicate beginning of defrost in the food item or the point at which the reflection coefficient undergoes the most dramatic change. Upon termination of high-power defrost, magnetron 14 is switched to low-power operation for a pre-selected time, which is determined in accordance with the food item 20. The pre-selected timed low-power defrost interval is determined, for example, from cookbook information involving the type of food item and its mass. If $\rho$ is greater than R, step 212 is entered whereby after a time delay $\Delta T$ the system returns to step 206.

The operation of the analog control network of FIG. 3 will now be described. For simplicity, it is assumed that attenuators 32 and 34 and detectors 36 and 38 have identical characteristics. The voltages, $V_f$ and $V_r$ which are the outputs of detectors 38 and 36 respectively and representative of forward and reflected power within waveguide 16 are amplified to suitable levels by amplifiers 88 and 86. The amplified voltage signals are then applied to integrators 92 and 90 that generate voltage outputs $V_{af}$ and $V_{ar}$ which are averages of the detector outputs. Integrators 90 and 92 are selected such that the averaging interval is taken over a time period sufficiently long to eliminate the rapid variations due to the rotation of the mode stirrer 18 but short enough to detect the effects of thawing of the food item 20. The averaged signals $V_{ar}$ and $V_{af}$ are applied to divider 94 which produces a signal on line 26 corresponding to the ratio $V_{ar}/V_{af}$. The signal on line 26 is compared to a level preset by potentiometer 100. With the ratio above the preset level comparator 98 generates a signal on line 102 which energizes coil 104 of relay 106. Switch arms 108 and 110 are connected to contacts 106c such that power control circuit 24 is energized by positive potentical $V_{dc}$ and magnetron 14 operates in the high power defrost mode. When the ratio signal on line 96 falls below the preset value the signal on line 102 is terminated de-energizing relay 106 whereby switch arms 108 and 110 assume the normally closed position engaging contacts 106b and 106a respectively. Power is then supplied to the timed defrost controller 116 which generates time defrost pulses on line 118 which are then applied over line 112 to power control circuit 24. As in the prior embodiments of the present invention, the time defrost mode is selected in accordance with the particular food item 20 and the mass thereof and magnetron 14 is energized in a low power state for the preset time defrost interval to complete thaw and defrost of food item 20.

In the analog network, upon initiation of the high-power defrost mode time delay relay 122 is actuated for a few seconds such that switch arms 124 and 126 are moved into contact with contacts 122a and 122b, respectively. The capacitor of integrator 90 is thereby charged to the voltage $V_{dc}$ while any charge on the capacitor to integrator 92 is discharged to ground. This start-up procedure ensures that the ratio signal on line 96 will initially be large enough to generate an energizing signal on line 102 for relay 106. After initialization relay 122 returns to the normally closed state with switch arms 124 and 126 in contact with contacts 122c and 122d.

From the above description, it can be seen that the present invention with either digital or analog control techniques utilizes the reflection coefficient of the oven to control the microwave heating process. Since it is well known that the most dramatic changes in the reflection coefficient occur as a food item is thawed, the control system of the present invention are particularly effective in regulating the defrost cycle of the microwave oven. Each system utilizes an initial high-power magnetron output and upon detection of the dramatic change of the reflection coefficient the magnetron is switched to a low-power time defrost interval. The present invention effectively speeds up the defrost operation by incorporating the initial high-power mode followed by a low-power mode operative until the food item is completely thawed.

What is claimed is:

1. In a microwave oven having a food heating cavity, a magnetron, and waveguide means for coupling the magnetron to the heating cavity, means for controlling the microwave oven heating cycle comprising:
   (a) detector means coupled to the microwave oven for measurement of the microwave reflection coefficient within the oven; and
   (b) means connected to said detector means and to the magnetron for regulating the power output of the magnetron in response to said measured reflection coefficient.

2. The combination in accordance with claim 1 wherein said detector means comprises a plurality of square law detectors coupled to said microwave oven, each of said detectors having an input probe disposed within the microwave oven for excitation by microwave energy within the oven, each of said detectors generating output signals proportional to the power input to said detectors.

3. The combination in accordance witg claim 2 wherein said detector means further comprises:
   means connected to said square law detectors for generating a control signal representative of the input reflection coefficient in response to said output signals of said square law detectors.

4. The combination in accordance with claim 3 wherein said regulating means comprises mean responsive to said control signal for switching the magnetron between the first and second power output levels.

5. The combination in accordance with claim 3 wherein said control signal generating means comprises:
   (a) means connected to said square law detectors for calculating the reflection coefficient in response to said output signals of said square law detectors; and
   (b) means for comparing said calculated reflection coefficient with a pre-determined value indicative of the state of the food item within the heating cavity and generating said control signal when said calculated value has a pre-determined relationship to said pre-determined value.

6. The combination in accordance with claim 3 wherein said control signal generating means further comprises means for periodically sampling said output signals of said detectors over a pre-determined time interval thereby averaging said output signal and generating said control signal representative of the average value of the reflection coefficient.

7. The combination in accordance with claim 1 wherein said detector means comprises:
   (a) Three square law detectors having input probes disposed linearly within the waveguide means and spaced apart by $\lambda/8$ where $\lambda$ is the wavelength of the microwaves at the operating frequency of the oven, said detectors generating first, second and third output signals proportional to the power input to said detectors.

8. The combination in accordance with claim 1 wherein said detector means comprises:
   (a) a directional coupler coupled to the waveguide means; and
   (b) first and second square law detectors disposed at opposite ends of said directional coupler, said first and second square law detectors generating first and second signals proportional to the forward and reflected power, respectively, within the waveguide means.

9. In a microwave oven having a food heating cavity, a magnetron, and waveguide means for coupling the magnetron to the food cavity, means for controlling the microwave heating cycle comprising:
   (a) a directional coupler coupled to the waveguide means;
   (b) first and second square law detectors having input probes disposed proximate opposite ends of said directional coupler, said first and second square law detectors generating first and second output signals proportional to the forward and reflected power, respectively, within the waveguide means;
   (c) means connected to the outputs of said first and second square law detectors for generating a control signal representative of the reflection coefficient within the microwave oven; and
   (d) means responsive to said control signal for regulating the power output of the magnetron.

10. The combination in accordance with claim 9 wherein said means for generating said control signal further comprises:
   (a) analog-to-digital converter means having inputs connected the outputs of said first and second detectors and outputs for converting said output signals of said detectors to digital signals; and
   (b) a microprocessor having inputs connected to the outputs of said analog-to-digital converter means and a control signal output, said microprocessor further comprising circuit means for calculating the reflection coefficient in accordance with the formula:

$$\rho = \sqrt{V_{rd}/V_{fd}}$$

where $V_{rd}$ is a digital signal representative of the reflected power within the waveguide means and $V_{fd}$ is a digital signal representative of the forward power within the waveguide means; said microprocessor comprising means for comparing the calculated value of the reflection coefficient to a pre-determined value and generating a control signal at said control signal output.

11. The combination in accordance with claim 9 wherein said control signal generating means further comprises:
   (a) first and second integrator circuit means connected to the outputs of said first and second detectors for averaging the output signals of said detector over a pre-determined time interval and generating average voltage output signals on first and second outputs of said integrators;
   (b) divider circuit means having first and second inputs connected to the outputs of said first and second integrator means, respectively, and an output, said divider circuit means generating an output signal and the proportional to the ratio of the average reflected power to the average forward power in the waveguide means;
   (c) comparator means having one input connected to the output of said divider circuit means and a second input to which is applied a pre-determined input signal, said comparator having an output on which said comparator generates a control signal when said output signal from said divider circuit means has a pre-determined relationship to said pre-determined input signal; and
   (d) means responsive to said output signal of said comparator for switching the power energization level of the magnetron from first to second power levels.

12. In a microwave oven having a food heating cavity, a magnetron, and waveguide means for coupling the magnetron to the food cavity, means for controlling the microwave oven heating cycle comprising:
   (a) three square law detectors having input probes disposed linearly within the waveguide means and spaced apart $\lambda/8$ where $\lambda$ is the wavelength of the microwaves at the operating frequency of the oven, said detectors having output signals proportional to the power input to said detectors;
   (b) means connected to the outputs of said detectors for generating a control signal representative of the reflection coefficient within the waveguide means; and
   (c) means connected to said control signal generating means and responsive to said control signal for regulating the power output of the magnetron.

13. The combination in accordance with claim 12 wherein said control signal generating means comprises:
   (a) analog-to-digital conversion means having an input connected to the outputs of said square law detectors for converting said output signals to digital signals, said digital signals applied to an output of said analog to digital conversion means; and
   (b) a microprocessor having digital inputs connected to the output of said analog-to-digital conversion means, and a control signal output, said microprocessor further comprising circuit means for calculating the reflection coefficient based upon the digital input signals from said analog-to-digital conversion means, said microprocessor further comprising a circuit means for comparing the calculated value of the reflection coefficient to a pre-determined value and further comprising a circuit means for generating a control signal on said control signal output when said calculated value of reflection coefficient has a pre-determined relationship to said pre-determined value.

14. In a microwave oven having a food heating cavity, a magnetron, and a waveguide means coupling the magnetron to the cavity, a method of controlling the heating process comprising the steps of:
   (a) detecting the microwave reflection coefficient within the oven;
   (b) generating a control signal in response to the detected reflection coefficient; and
   (c) regulating the power output of the magnetron in response to said control signal.

15. The combination in accordance with claim 14 wherein the said step of detecting the reflection coefficient comprises the steps of:
   (a) coupling at least two square law detectors to the microwave oven, said square law detectors generating output signals proportional to the input microwave power thereto; and
   (b) calculating the reflection coefficient from said signals generated by said square law detectors.

16. The combination in accordance with claim 15 wherein the step of generating a control signal comprises the steps of:
   (a) comparing the calculated value of the reflection coefficient with a pre-determined value; and
   (b) generating said control signal when said calculated value of said reflection coefficient has a predetermined relationship to said predetermined value.

17. The combination in accordance with claim 15 wherein the step of detecting the reflection coefficient further comprises the steps of:
   (a) sampling the output signals of said square law detector over a pre-determined time interval; and
   (b) calculating the average value of the reflection coefficient over said pre-determined time interval.

18. The combination in accordance with claim 17 wherein the step of generating a control signal comprises the steps of:
   (a) comparing the average value of reflection coefficient to a pre-determined value; and
   (b) switching the magnetron from an initial high-power output to a low-power input when the computed average value of the reflection coefficient has a predetermined relationship to said pre-determined value.

19. In a microwave oven having a food heating cavity, a magnetron, and waveguide means for coupling the magnetron to the heating cavity, means for controlling the microwave oven heating cycle comprising:
   (a) detector means coupled to the waveguide means for measurement of the forward and reflected power within the waveguide means; and
   (b) means connected to said detector means and to the magnetron for regulating the power output of the magnetron in response to said measured forward and reflected power.

* * * * *